Jan. 19, 1965  P. DI STEFANO  3,166,298
FLUID OPERATED MOTOR VEHICLE LIFTING JACK
Filed Dec. 4, 1962  2 Sheets-Sheet 1

INVENTOR.
PETER DI STEFANO.
BY
ATTORNEY.

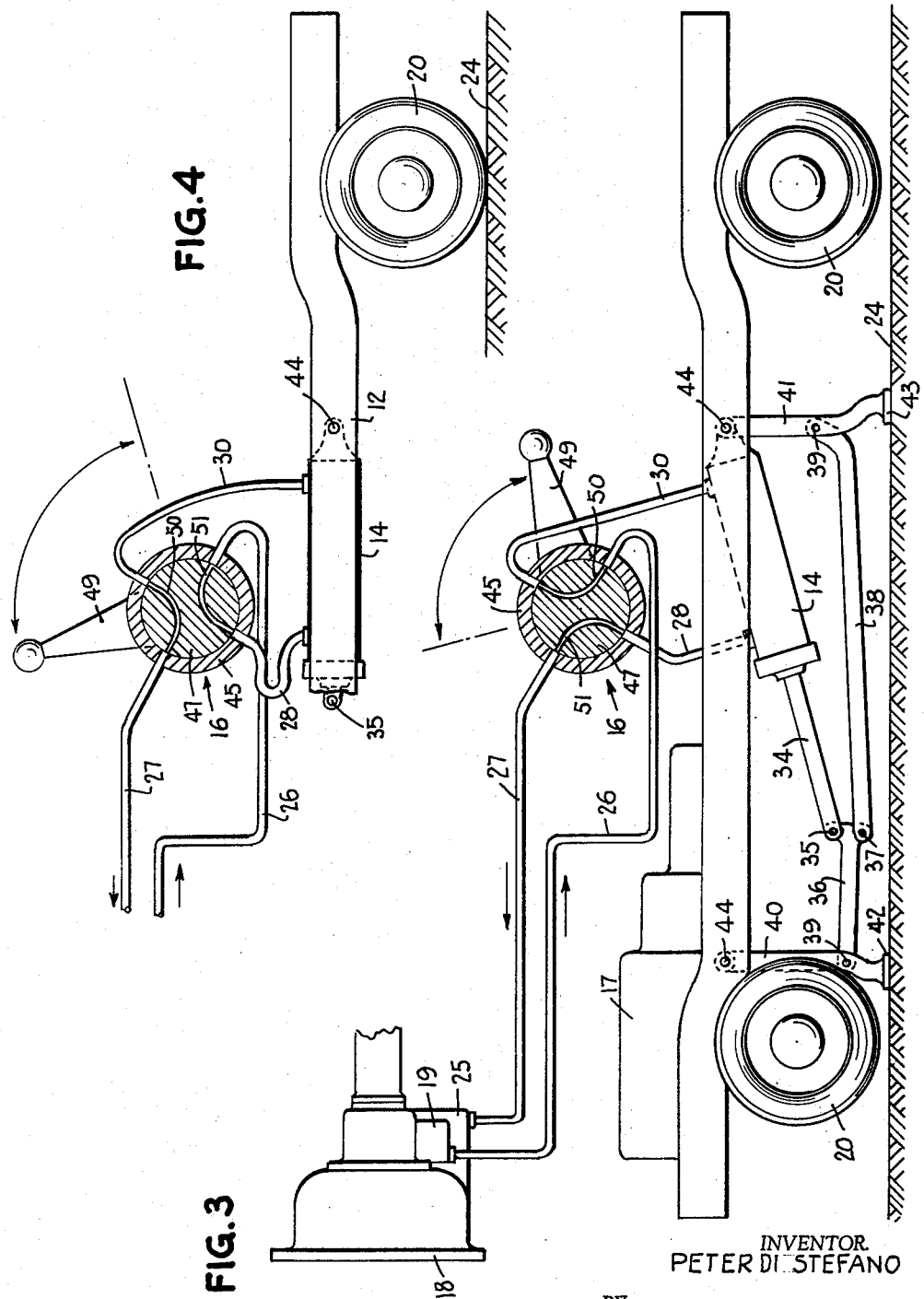

United States Patent Office 3,166,298
Patented Jan. 19, 1965

3,166,298
FLUID OPERATED MOTOR VEHICLE LIFTING JACK
Peter Di Stefano, 3416 Grace Ave., New York, N.Y.
Filed Dec. 4, 1962, Ser. No. 242,146
1 Claim. (Cl. 254—86)

This invention relates broadly to lifting jacks for motor vehicles, and more particularly to an inbuilt lifting jack for a motor vehicle wherein the lifting jack is secured to and permamently carried by the vehicle.

During the course of travel, motorists have frequently found it necessary to raise their vehicles above the ground in order to remove and replace defective tires. Manually operated lifting jacks, such as are now commonly in use, are awkward and cumbersome to handle, especially because a great many motor vehicle operators are female.

In order to simplify raising and lowering a motor vehicle, it is the principal object of the present invention to provde a lifting jack which is secured to and permanently carried on the underside of the frame of a motor vehicle.

A further aim of the present invention resides in the provision of a lifting jack of this character, which is fluid operated.

Yet another feature of the present invention resides in the provision of a lifting jack of this character, which is associated with the transmisson system of a motor vehicle and activated by the flow of transmission oil in the transmission system.

An additional purpose of the present invention resides in the provision of a liftng jack of the character referred to, which is activated by a lever in the control of the operator of the motor vehicle, while he remains seated behind the steering wheel of his vehicle.

These and other meritorious aims and advantages of this invention, which will become more fully apparent as the description hereof proceeds, are attained by the novel construction, combination and arrangement of parts, hereinafter described, and illustrated in the accompanying drawings, constituting a material component of this disclosure, and in which:

FIGURE 3 is a fragmentary side elevational view of the motor vehicle mechanism, the motor vehicle being illustrated as having been lifted by a lifting jack constructed in accordance with the present invention.

FIGURE 4 is a fragmentary side elevational view, partly in section, of one end of a motor vehicle, showing the lifting jack in inoperative position.

Figure 1:
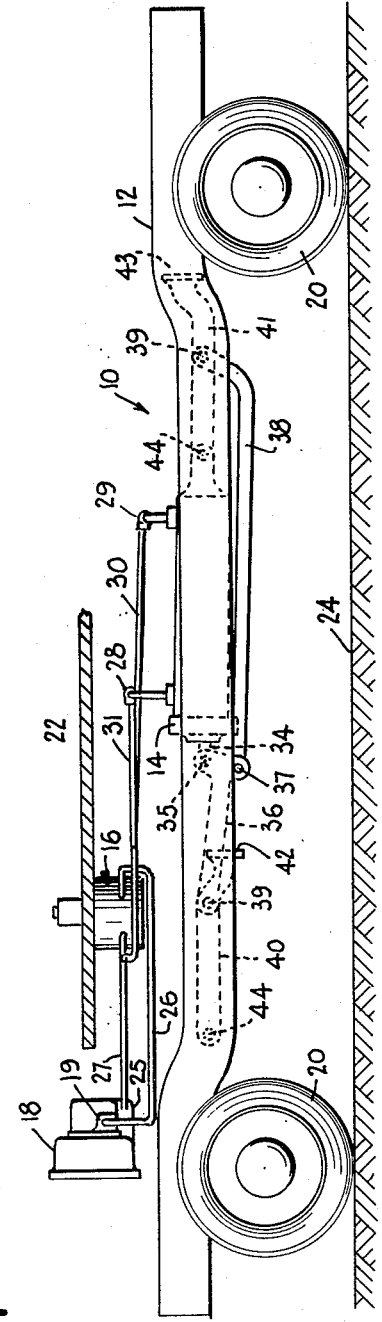
FIGURE 1 is a side elevational view of a motor vehicle having a lifting jack secured thereto, which is constructed in accordance with the present invention, the lifting jack being illustrated in retracted or inoperative position.

Referring in greater detail to the drawings, the numeral 10 refers broadly to the chassis or frame of a conventional motor vehicle. Frame 10 comprises broadly a pair of spaced-apart sides 12. Adjacent each of the said sides 12 and spaced therefrom is a conventional oil cylinder 14. The motor vehicle frame is further provided, at proper and desirable locations, with a hydraulic valve, broadly referred to by the numeral 16, and with a motor 17.

Further illustrated as standard equipment for a motor vehicle frame, and not as a part of the present invention, is a transmission 18, providing oil pressure as at 19. Conventional wheels are illustrated at 20, the floor of the motor vehicle at 22, and the ground upon which the motor vehicle moves at 24.

The transmission 18 is here illustrated as having a sump 25. A line or pipe 26 leads from the oil pressure area to the hydraulic valve 16, and a line or pipe 27 leads from the hydraulic valve 16 to the oil sump 25. A pair of spaced-apart lines, respectively referred to by the numerals 28 and 29 lead from the hydraulic valve 16 to the oil cylinders 14, and a pair of fuel pipes or lines 30 and 31 respectively lead from the hydraulic valve 16 to the oil cylinders 14.

The said hydraulic valve 16 comprises broadly a rotor 47 which is contained in a housing 45. The said rotor 47 is provided with a pair of spaced-apart passages respectively 50 and 51, the said passage 50 providing clearance for the passage of lines or pipes 27 and 30 thereacross, and the passage 51 providing clearance for the passage of lines or pipes 26 and 28 thereacross.

Each of the said oil cylinders 14 has a piston rod 34 reciprocating therein, a part of each of the said piston rods projecting outwardly from the said oil cylinders.

The elements hereabove described are conventional and do not constitute a part of the present invention.

The present invention comprises a pair of legs 40 and 41, respectively, each of the said legs terminating at its upper end in an opening for the passage of a fulcrum pin 44 therethrough and through one of the sides 12 of the motor vehicle frame. The said legs 40 and 41 are spacedly secured to the motor vehicle frame. Fulcrum pin 44 which passes through the upper end of leg 41 also passes through one end of cylinder 14, so that each of the said legs 41 is joined with one end of each cylinder 14 by the said fulcrum pin 44. Substantially at their center, each of the said legs 40 and 41 is provided with an opening for the passage therethrough of pins 39.

The invention further comprises a pair of connecting rods 36 and 38 respectively. One of the ends of connecting rod 38 is provided with an opening therein for the passage of pin 39 therethrough whereby connecting rod 38 is pivotally secured to the said leg 41. At its other end, connecting arm 38 is pivotally connected to one end of connecting arm 36 by pin 37. The cylinder piston rod 34 is connected by pin 35 to the end of connecting rod 36 hereabove referred to and spaced from arm 38 as illustrated in FIGURE 3. The other end of the said connecting rod 36 is pivoted to leg 40 by pin 39. The housing 45 of hydraulic valve rotor 47 is provided with a handle 49 which is so positioned in the motor vehicle, that it will be in convenient reach of the operator of the velhicle when he sits behind the steering wheel of his vehicle.

The device is used in the following manner:
When the jack is inoperative, the handle 49 is in the position shown in FIGURE 4. When the operator of the vehicle desires to raise his vehicle above ground 24, he moves handle 49 manually to the position indicated by a dot-and-dash line in FIGURE 4 of the drawing, and illustrated in solid lines FIGURE 3. When the jack is activated, conventional action of rotor 47, will force oil into cylinder 14 through pipe 26. This will force cylinder piston rod 34 out of the cylinder, which action will force connecting rod 38 and the said connecting rod 36 connected thereto and to the said cylinder piston rod 34 into the position illustrated in FIGURE 3, whereby the said legs 40 and 41 are lowered and the motor vehicle is raised by causing it to stand upon feet 42 and 43, respectively, which are provided at the lower ends of legs 40 and 41 respectively. When the vehicle is to be lowered, the operator brings the handle back into the position illustrated in FIGURE 4, causing the transmission fluid to be withdrawn from cylinder 14 through pipes 30 and 27, whereby piston rod 34 will be drawn into cylinder 14 and the legs 40 and 41 will be retracted, thereby lowering the motor vehicle.

Figure 2:
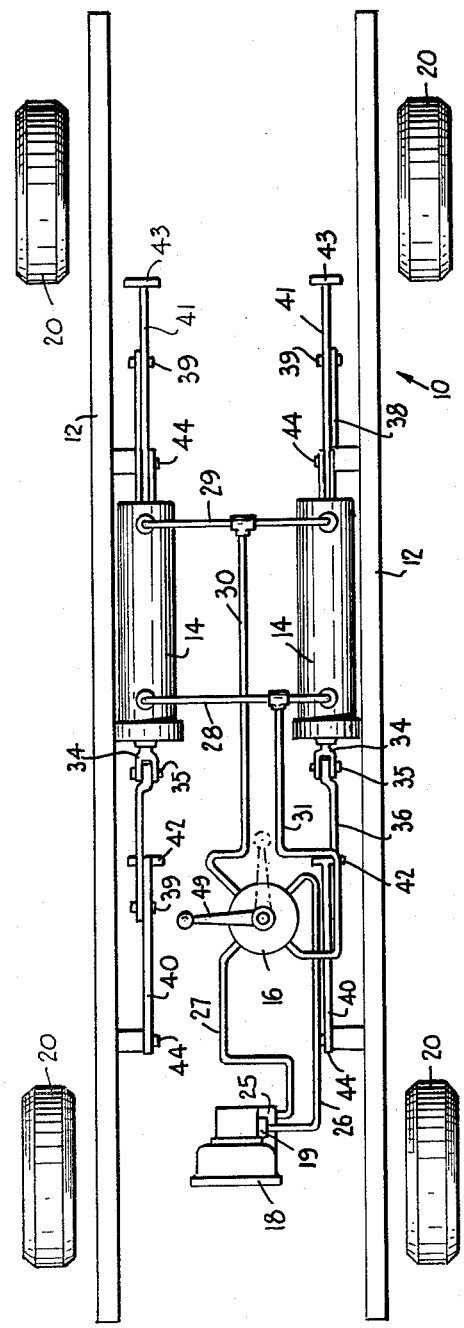
FIGURE 2 is a diagrammatic bottom plan view of the motor vehicle illustrated in FIGURE 1.

While one pair of legs 40 and 41 is hereabove described in detail, the invention contemplates the use of two identical pairs, one pair for each of the said sides 12 of the motor vehicle frame. Each of said pair of legs is connected to and activated by the oil cylinder 14 adjacent that side of the vehicle frame to which the said pair of legs is pivotally secured, as is illustrated in FIGURE 2 of the drawings. When it is necessary to raise a motor vehicle upon relatively soft ground, the operator will find it expedient to place a block of wood beneath the car where the feet 42 and 43 will be positioned. Thus the feet will rest upon the wood and not upon the soft ground. Appropriate blocks of wood can be conveniently carried in the trunk of the vehicle.

The motor vehicle frame illustrated in the drawings, it is to be understood, is one of many types of frames now in use. The jack of the present invention can be used effectively on all types of motor vehicle frames, the only modification being a possible minor adjustment in shape and size of the present invention. The transmission system illustrated in the drawings is also one of several types now in use. The present invention can be used in connection with all transmission systems in which the flow of oil causes reciprocation of oil cylinder piston rods.

There has thus been shown and described an inbuilt, fluid operated listing jack for a motor vehicle in the preferred embodiment. It is to be understood however, that the present disclosure is to be regarded as illustrative and descriptive only of the best known form of the present invention and not as limitative or restrictive to the exact details shown, applicant reserving the right to make such changes in his invention as might come within the scope of the appended claim without thereby departing either from the spirit or the scope of the present invention.

Having thus described the invention, what is claimed as new and desired to secure by Letters Patent, is:

An inbuilt lifting jack for a motor vehicle, said lifting jack activated by the flow of transmission fluid through the transmission system of the motor vehicle, said lifting jack comprising the combination with a motor vehicle chassis including a pair of sides, a pair of oil cylinders, each of the oil cylinders adjacent one of the sides of the chassis and spaced therefrom, a horizontally reciprocating piston rod in each oil cylinder, a transmission, a hydraulic valve, the hydraulic valve interposed between the transmission and the oil cylinders, lines leading from the transmission through the hydraulic valve to the oil cylinders, the reciprocation of the piston rods in the oil cylinders caused by the flow of transmission fluid into and out of the oil cylinders; of a pair of longitudinally spaced legs pivotally mounted at one end to each side of the chassis, the other end of each leg defining a foot, one end of one leg of each pair having one of said cylinders secured thereto, first link means pivotally connected to said one leg of each pair, second link means pivotally connected to the other leg of each pair, said first and second link means being pivotally connected to each other remote from said legs of each pair, means pivotally connecting each of said piston rods to said second link means, control means on said valve for controlling the flow of oil into and out of said cylinders to thereby reciprocate said pistons to raise and lower said legs.

References Cited by the Examiner

UNITED STATES PATENTS

| | | | |
|---|---|---|---|
| 1,334,644 | 3/20 | Atherton | 188—5 |
| 1,924,276 | 8/33 | Gerstenberger. | |
| 2,006,242 | 6/35 | Imai. | |
| 3,005,521 | 10/61 | Blain | 188—5 |
| 3,007,717 | 11/61 | Noly | 280—150.5 |

WILLIAM FELDMAN, *Primary Examiner.*